United States Patent [19]

Hein et al.

[11] 3,888,787

[45] June 10, 1975

[54] METHOD OF PRODUCING BALL-SHAPED METALLIC OXIDE OR METALLIC CARBIDE PARTICLES

[75] Inventors: Kurt Hein; Erich Zimmer, both of Julich, Germany

[73] Assignee: Kernforschungsanlage Julich Gesellschaft mit beschrankter Haftung, Julich, Germany

[22] Filed: Sept. 11, 1972

[21] Appl. No.: 288,098

[30] Foreign Application Priority Data

Sept. 23, 1971 Germany............................ 2147472

[52] U.S. Cl..... 252/301.1 S; 252/301.1 R; 264/0.5; 423/256
[51] Int. Cl............................................. G21c 21/00
[58] Field of Search............... 252/301.1 S, 301.1 R; 423/256; 264/0.5

[56] References Cited
UNITED STATES PATENTS

| | | | |
|---|---|---|---|
| 3,171,715 | 3/1965 | Kleinsteuber.............. | 252/301.1 S |
| 3,312,632 | 4/1967 | Smith........................ | 423/256 X |
| 3,326,812 | 6/1967 | Smith et al................. | 252/301.1 S |
| 3,397,257 | 8/1968 | Brambilla et al............ | 252/301.1 S |
| 3,463,842 | 8/1969 | Flack et al.................. | 252/301.1 S |
| 3,514,412 | 5/1970 | Triggiani et al............. | 252/301.1 S |
| 3,535,264 | 10/1970 | Hackstein et al........... | 252/301.1 S |
| 3,536,793 | 10/1970 | Norman et al............... | 252/301.1 S |
| 3,617,584 | 11/1971 | Flack et al................ | 252/301.1 S X |
| 3,669,632 | 6/1972 | Kanij et al..................... | 423/256 X |

OTHER PUBLICATIONS

Handbook of Chemistry and Physics, 44th Ed. Chemical Rubber Publishing Co., Cleveland, 1963, pp. 1146–47.

Primary Examiner—Leland A. Sebastian
Assistant Examiner—R. E. Schafer
Attorney, Agent, or Firm—Walter Becker

[57] ABSTRACT

A method of producing ball-shaped metallic oxide or metallic carbide particles which includes the steps of introducing an aqueous solution of a metallic nitrate or metallic chloride or a mixture or a colloidal solution of such metallic nitrates or chlorides dropwise into an organic phase in a column which comprises a lower phase of an aqueous ammonia solution and an upper phase of a ketone or mixture of ketones.

8 Claims, 1 Drawing Figure

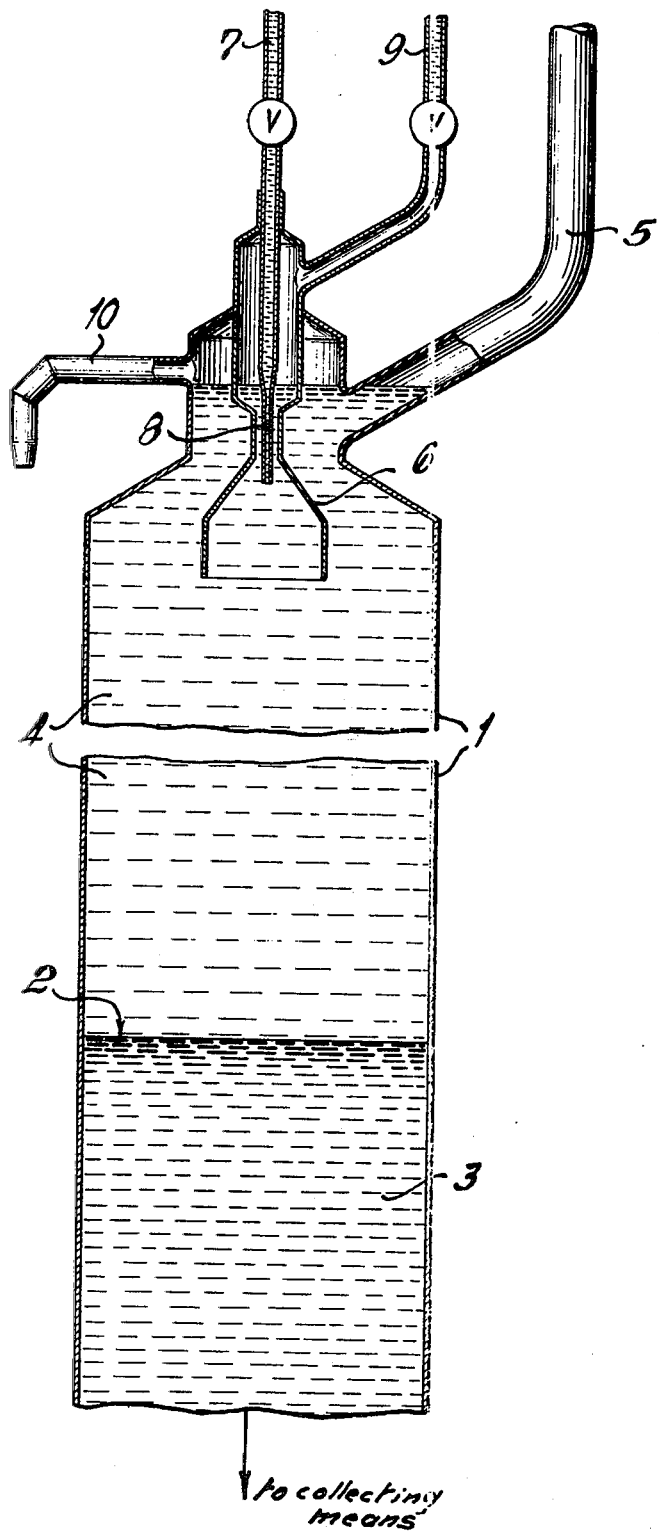

METHOD OF PRODUCING BALL-SHAPED METALLIC OXIDE OR METALLIC CARBIDE PARTICLES

The present invention relates to a method of producing ball-shaped metallic oxide or metallic carbide particles, especially particles consisting of fuels or breeding materials for nuclear reactors, such as oxides or carbides of uranium, plutonium, thorium or the like, which particles have a diameter of from 0.01 to 1.5mm, preferably from 0.05 to 1.5mm. According to this method, an aqueous solution of a metallic nitrate or a metallic chloride or a mixture of metallic nitrates or metallic chlorides or a colloidal solution, is introduced in dropwise form into an organic phase which exists above an aqueous ammonia solution. According to this method, the molarity of the metallic ions lies between 0.4 and 1.5, while for formation of carbides, carbon in colloidal form is added to the aqueous solution and/or to the colloidal solution, and the first formed oxide particles, which contain carbon, are sintered.

Such particles serve various purposes. They are used especially in fuel or breeding elements for example in the form of balls of graphite in nuclear reactors as fuels or breeding materials.

Various methods are known for the manufacture of such ball-shaped metallic oxide or metallic carbide particles. Thus it is known, for example, to produce ball-shaped fuels or breeding materials by dropwise adding a metallic salt solution or a colloidal solution into a hot organic solvent, such as paraffin oil, which is only miscible with water to a slight extent. In connection therewith, these drops are consolodated by dehydration by means of the solvent or by a chemical reaction. This occurs with a known process by raising the pH value of the dropped in solution by means of an ammonia yielding substance. With this known method, the ball shape of the particles is formed by means of the surface forces existing between the drops of metallic salt solution or colloidal solution, introduced into the organic solution, and the organic solvent. International Atomic Energy Agency, Vienna 1968, Proceedings of a Panel, p 23 et. seq. However, with this method is it necessary to heat up the organic fluid. Moreover, it is necessary, in order to prevent blocking, to cool those parts which are arranged above the organic fluid for carrying out the method and which are intended for introduction in dropwise form of the solution. Both measures raise the operating expenses necessary for carrying out this method.

To the state of the art also belongs a method for making oxide or carbide particles of uranium, thorium, or plutonium, according to which a colloidal solution of these oxides or carbides is dropwise introduced into 2-ethylhexanol having a specific water content. Oak Ridge National Laboratory, ORNL–4429 (1967/1968), p 22 et. seq. The particle formation is in this connection a result of gelling. Since this gelling process takes a relatively long time, the dropped in colloidal solution and the 2-ethylhexanol are conveyed in countercurrent to one another. This method requires constant supervision and adjustment of the water content of the 2-ethylhexanol, because it is necessary to precisely maintain the predetermined relationship between water and ethylhexanol. In addition, the manufacture of the colloidal solution is very expensive.

It is further known, to introduce drops of a solution of a metallic salt or of a colloidal solution formed from a metallic salt into an aqueous ammonia solution. During this process gelatinous balls are formed by means of precipitation reactions. 17 Energia Nucleare 217 (1970); Kerntechnik, 12th year issue, p 159 (1970). With this method it is necessary, in order to obtain the desired ball shape, to mix viscosity increasing substances, for example methylcellulose or polyvinylalcohol, in considerable amounts, with the solutions of metallic chloride or nitrate being used, or with the colloidal solutions of these nitrates or chlorides. This method is uneconomical in that the organic materials must be removed prior to the sintering process which is necessary in order to be able to use the particles. To prevent the drops from deforming upon impacting upon the upper surface of the aqueous ammoniacal solution being used, it is necessary to preharden these drops prior to the impact. To this end, the drops must pass through a path of a specific length in an ammoniacal atmosphere. This results in a relatively large consumption of ammonia and a requirement for special devices for carrying off ammonia fumes. In addition, the nozzles for the solution or colloidal solution which is to be dropped in must be prevented from being blocked by the effect of the ammonia.

A further method is also known, according to which ball-shaped particles are formed from drops of solutions or colloidal suspensions of nuclear fuels by means of an ammonia containing organic solvent. Euratom Symposium on Fuel Cycles for High Temperature Gas-cooled Reactors, Brussels, Belgium, June 10–11, 1965: Preparation of Uranium Dioxide and Carbide Particles by Sol-Gel-Methods. This method is, therefore, particularly disadvantageous because the desired reactions are very slow.

Finally, there is also a method known for manufacturing ball-shaped metallic oxide or metallic carbide particles according to which an aqueous colloidal suspension of the metallic oxide, or an aqueous solution of the metallic salt, is introduced dropwise into a bath containing an organic solvent. Further according to this method, in case the production of carbides is desired, colloidal carbon is added to the colloidal suspension or to the aqueous solution, and the carbon containing oxide particles formed thereby are sintered. German Auslegeschrift No. P 1812326.7-41. With this method, a water saturated solvent is introduced, in which connection a layer of aqueous ammonia is arranged so as to form a layer below the solvent. Until now only hexanol and butanol have been used as solvents. These solvents, however, have a high viscosity. This is, therefore, very disadvantageous, for the rate of descent of the drops is very low. Hence it follows that there are difficulties in passing through the phase boundary of the two superimposed fluid layers. In addition thereto, butanol has a considerable dissolving power for water. A further suggestion pertaining to the state of the art, to use hydrocarbons, is therefore inappropriate, because hydrocarbons are strongly and distinctly water repellent.

It is an object of the present invention to provide a method of producing ball-shaped metallic oxide or metallic carbide particles which guarantees that the aqueous drops which are introduced into a solution will assume a ball shape.

It is a further object of the invention that the method also guarantee that the ball shape of the drops be sufficiently fixed prior to entry into a subsequent aqueous phase and at the same time assure that the viscosity of the solvent is so high that the rate of descent of the introduced fluid suffice to allow passage through the phase boundary between solvent and aqueous phase.

It is also an object of the present invention that the surface tension between the organic and the aqueous solution not be so great as to impede or make more difficult the passing of the drops through the phase boundary.

These and other objects and advantages of the invention will appear more clearly from the following specification in connection with the accompanying drawing which shows an embodiment of a device for carrying out the method according to the invention.

The invention is characterized primarily in that a ketone or ketone mixture is used for the organic phase, which ketone at room temperature has a dissolving power for water of up to about 4 percent by weight and has a viscosity between one half and twice that of water.

An especially favorable ketone is methyl isobutyl ketone. In this connection it has been found that the prehardening of the drops introduced into the methyl isobutyl ketone is so excellent that, despite a drop height of only about 30 to 40 cm. within this layer, the phase boundary relative to the aqueous ammonia solution is passed through without deformation thereof. In addition, the prehardened drops formed in the organic layer pass through the phase boundary without significant deceleration. The use of auxiliary measures, as was necessary with prior known methods of producing ball-shaped metallic oxide or metallic carbide particles, in order to prevent or impede the resistance which the phase boundary between the organic layer and the aqueous ammonia solution offers to the prehardened drops, is therefore no longer required. And since the height of the aqueous ammonia solution layer is only about 50 cm., the further advantage or preference for the use of the method according to the invention results in that for carrying out the method, only a relatively short apparatus is required. This is of particular significance if, as starting material for the production of ball-shaped particles, materials are used which have such a radioactivity that special protective measures are necessary for use therewith.

Since it is not necessary to agitate the boundary layer or interface between the two phases arranged one above the other, a further considerable advantage of the method according to the invention is obtained in that the columns used in connection therewith may have a much greater diameter than was the case with prior known methods where an organic fluid layer and an aqueous ammoniacal layer were arranged one above the other. This has the further advantage that the ammonia consumption is very slight. Ammonia need be supplied only to the extent that it corresponds to the consumption generated by the precipitation reaction.

In order to obtain as high a resistance or stability as possible of the ball-shaped particles formed with the method according to the invention against mechanical stress, it is advantageous to add methylcellulose to the solution of the metallic nitrate and/or the metallic chloride and/or to the colloidal solution of this nitrate or chloride in such a quantity that its concentration is between 0.5 and 1 g/l.

Instead thereof, it may also be expedient to add polyvinyl alcohol to the solution of the metallic nitrate and/or the metallic chloride and/or to the colloidal solution of this nitrate or chloride in such a quantity that its concentration is between 0.5 and 5 g/l.

Referring now to the drawing in detail, the arrangement shows a column 1 in which two fluid layers 3,4 separated by the phase boundary 2, are arranged one above the other. In this connection, the lower fluid layer 3 is an aqueous ammonia solution; the layer 4 formed thereabove comprises a ketone or a ketone mixture which at room temperature has a dissolving power for water of up to 4 percent by weight and has a viscosity between one half and twice that of water, for example, ammonia containing methyl isobutyl ketone. Both fluids are introduced into the column 1 through the inlet 5; in fact, in order from the beginning of the method according to the invention to obtain an adequate ammonia content in the organic phase formed by the ketone, the organic phase is added first; subsequently thereto, the aqueous ammonical phase, which has the higher specific gravity, is added. The metallic salt solution and/or the colloidal solution are introduced through the feed pipe 7, which discharges into a bell 6 which is immersed in the organic fluid. It has been shown to be expedient in this connection to allow the feed pipe 7 to lead into a cannula 8. In order to make sure that ammonia free fluid constantly flows around the cannula 8 of the feed pipe 7, which cannula 8 discharges into the bell 6, the bell 6 is connected to a feed pipe 9, which is connected to a storage bin (not shown in the drawing) for the organic fluid. To prevent the upper liquid level from rising in the column 1, an overflow 10 is provided. This arrangement has proven itself during performance of the method according to the invention. It is, of course, possible to provide more cannulae 8 or nozzles within the bell 6. In order to raise the throughput, it may be expedient if necessary to spray the metallic salt solution and/or the colloidal solution under pressure into the organic phase. In addition thereto, the throughput may be additionally raised by vibrating the nozzle.

The present invention will be further explained by reference to the following examples.

EXAMPLE 1

1 liter of an 0.7 molar solution of Th $(NO_3)_4 \cdot 5 H_2O$ in water is preneutralized by the addition of about 2 moles of ammonia in the form of concentrated ammonia water. A turbid solution results from this, which solution is stabilized and brought up to its original thorium concentration by boiling it at its boiling temperature.

The solution is subsequently sent through the apparatus shown in the drawing at the rate of 200 ml/h. The inner diameter of the cannula which is used is 0.5 mm. Uniform gel balls result, which are collected in a round-bottom flask below the column in ammonia water. The height of the organic phase, formed of methyl isobutyl ketone, is 30 cm; the height of the ammonia water layer is 50 cm.

After the solution has been completely treated, the gel balls are first washed with ammonia water; subsequently the water is displaced from the gel balls by treating the latter twice with acetone. Subsequent thereto, the ball-shaped particles formed thereby are dried in a drying oven which is heated up at a rate of 20°/h to 150° C. The ball-shaped particles are then calcined or roasted and sintered, in which connection the temperature is raised up to 1,400° C. Ball-shaped $ThO_2$ particles result, having an average diameter of about 600 µm with aberrations not greater than 50 µm to both sides. The density of the particles is remarkably high in that it is 99.9 percent of the theoretical density; the yield of usable particles is 95 percent.

EXAMPLE 2

1 liter of a solution is produced which contains 0.6 moles of $Th(NO_3)_4 \cdot 5 H_2O$ and 0.1 moles $UO_2(NO_3)_2 \cdot 6 H_2O$. This solution is preneutralized by the addition of 1.5 moles of concentrated ammonia water and is treated to form gel balls as per Example 1.

After the washing, the gel balls are treated with methyl alcohol and dried in superheated steam, in which connection the temperature is raised up to 250° C. During the subsequent calcination and sintering, the uranium-oxide is reduced to $UO_2$ by means of a mixture of 4 percent hydrogen in argon, and $(Th,U) O_2$ mixed oxide particles are produced. The size and shape of the particles are the same as those produced in Example 1, the density being also over 99 percent of the theoretical density.

EXAMPLE 3

A solution is produced just as in Example 2. In addition, 3 g/l polyvinyl alcohol are added. In other respects the same method steps as taken in Example 2 are applied, and similar results are obtained. The density is 99 percent of the theoretical density.

It is, of course, to be understood that the present invention is by no means limited to the specific showing in the drawing or examples but also comprises any modifications within the scope of the appended claims.

What we claim is:

1. A method of producing ball-shaped particles in a column, said particles being selected from the group consisting of metallic oxides and metallic carbides, which includes the steps of: introducing an organic phase into said column, said organic phase being one selected from the group consisting of ketones and ketone mixtures, which at room temperature have a dissolving power for water not greater than four per cent by weight at room temperature and a viscosity between one half and twice that of water said ketones and ketone mixtures containing a water quantity below that of ketones and ketone mixtures in equilibrium with ammonia; introducing an aqueous ammonia phase into said column, said aqueous ammonia phase having a higher specific gravity than said organic phase, thus settling below the latter; dropwise introducing into said organic phase an aqueous solution, said solution being one of a material selected from the group consisting of metallic nitrate, metallic chloride, mixtures of metallic nitrates and metallic chlorides, and colloidal solutions of metallic nitrates and metallic chlorides; and collecting the resulting particles.

2. A method of producing ball-shaped particles in a column, according to claim 1, in which the molarity of the metallic ions of said aqueous solution is between 0.4 and 1.5.

3. A method of producing ball-shaped particles in a column, according to claim 1, in which the formation of carbides includes the steps of adding carbon in colloidal form to said aqueous solution and sintering the first formed carbon containing oxide particles.

4. A method of producing ball-shaped particles in a column, according to claim 1, in which said organic phase is methyl isobutyl ketone.

5. A method of producing ball-shaped particles in a column, according to claim 1, which includes the step of adding methylcellulose to said aqueous solution in such an amount that the concentration is between 0.5 and 1 g/l.

6. A method of producing ball-shaped particles in a column, according to claim 1, which includes the step of adding polyvinyl alcohol to said aqueous solution in such an amount that the concentration is between 0.5 and 5 g/l.

7. A method of producing ball-shaped particles in a column, according to claim 1, in which said particles are selected from the group consisting of fuels and breeding materials for nuclear reactors and have a diameter of from 0.05 to 1.5 mm.

8. A method of producing ball-shaped particles in a column, according to claim 1, in which the metallic component of said particles is one selected from the group consisting of uranium, plutonium, and thorium.

* * * * *